_United States Patent_ [19]

Ginter et al.

[11] 4,007,148
[45] Feb. 8, 1977

[54] ELECTROCONDUCTIVE COATINGS HAVING EXCELLENT COATING HOLDOUT PROPERTIES

[75] Inventors: Sally P. Ginter; Ralph E. Friedrich, both of Midland, Mich.

[73] Assignee: The Dow Chemical Company, Midland, Mich.

[22] Filed: Dec. 19, 1974

[21] Appl. No.: 534,384

[52] U.S. Cl. .................... 260/29.6 WB; 260/17 R; 260/29.7 W; 428/511
[51] Int. Cl.$^2$ ......................................... C08L 47/00
[58] Field of Search ............ 260/29.6 WB, 29.7 W, 260/17 R; 428/511

[56] References Cited

UNITED STATES PATENTS

| | | | |
|---|---|---|---|
| 2,923,692 | 2/1960 | Ackerman et al. | 260/28.5 R |
| 3,479,215 | 11/1969 | Cavagna et al. | 204/2 |
| 3,607,989 | 9/1971 | Sonnabend | 260/93.5 |
| 3,674,711 | 7/1972 | Growald et al. | 260/17 R |
| 3,699,112 | 10/1972 | Konishi et al. | 260/17 R |
| 3,714,104 | 1/1973 | Bergomi, Jr. | 260/29.6 WB |
| 3,932,564 | 1/1976 | Markhart et al. | 428/511 |

OTHER PUBLICATIONS

Chem. Tech., May, 1971, pp. 304–309, Dolinski et al.

Primary Examiner—M. J. Welsh
Attorney, Agent, or Firm—M. S. Jenkins; R. B. Ledlie

[57] ABSTRACT

An electroconductive composition useful for coating raw paper stock is provided by combining (1) an electroconductive resin, e.g., poly(vinyl/benzyl trimethyl ammonium chloride) and (2) a water-swellable, cross-linked polymer, e.g., crosslinked polyacrylamide, in the form of discrete particles having swollen diameters in the range from about 1 to about 100 micrometers. Application of this electroconductive coating composition to paper or to some other nonconductive substrate yields an article having decreased surface electrical resistivity and increased organic solvent resistance or holdout. Solvent resistance and other coating properties are further enhanced by including in the electroconductive composition a water-dispersible, film-forming amide polymer and a low viscosity binder such as a latex of styrene/butadiene copolymer.

16 Claims, No Drawings

ELECTROCONDUCTIVE COATINGS HAVING EXCELLENT COATING HOLDOUT PROPERTIES

BACKGROUND OF THE INVENTION

This invention relates to electroconductive coating compositions and to coated articles employing them.

In the manufacture of many articles employing nonconductive substrates as a component part of such articles, it is often desirable to reduce the surface electrical resistivity of the nonconductive substrate to a value below $10^{14}$ ohms at 10 percent relative humidity. For example, paper which has been rendered electroconductive may be used to distribute electrical stresses in various insulating products. Also, the support normally used in electrographic, electrophotographic, electrostatic and other nonimpact printing processes is conductive or is coated with a conductive layer, and as such plays a role in the formation of the image or the record.

In electrophotographic recording elements, a photoconductive layer stands in contact with an electroconductive layer or sheet, the latter being present to enable charging of the photoconductive layer and to carry off the electrostatic charges from the areas of the photoconductive layer undergoing an exposure to light rays. As the photoconductive or photoresponsive material, there is presently being used a specially treated zinc oxide coating. Where light strikes portions of the paper treated with such a light sensitive material, the electrical charge is dissipated in those areas exposed to light. As a result, there is left a pattern of charged and uncharged areas. The charged area will then be effective to attract an oppositely charged powder, or other usually particulated image forming material. Such a powder will not be attracted to the light affected discharge areas, and the powder may thus be deposited on the paper in a pattern which corresponds with the charged areas. Generally, such an image forming material may then be fused, or otherwise treated, on the paper to make the image permanent. Such an image forming material is often a wax coated finely divided carbon black which will fuse when heated on the paper.

While other nonimpact printing processes differ from the above in that the images are created by electrical dissipation of the static charge in nonimage areas, all require as a common characteristic an electrically conductive substrate such as an electroconductive paper.

Conventionally, paper and other nonconductive substrates have been rendered electroconductive by coating same with various electroconductive additives such as water-soluble quaternary ammonium polymers as ememplified in Silvernail et al, U.S. Pat. No. 3,011,918, Booth et al, U.S. Pat. No. 3,544,318, Cavagna et al, U.S. Pat. No. 3,479,215, and Rogers et al U.S. Pat. No. 3,320,317.

Because of their relatively high cost electro-conductive resins are seldomly applied directly to raw paper stock. Instead, the base substrate, such as raw paper stock, is generally precoated with conventional paper coating for impact printing such as a combination of binder and pigment. Subsequently, the electroconductive resin is formulated in an aqueous coating composition containing in addition to it a film-forming binder such as starch, polyvinyl alcohol, or a latex and a suitable pigment such as clay, calcium carbonate and the like. The type and amount of binder has a pronounced effect not only on the surface electrical resistivity of the resultant layer but also upon the resistance to organic solvents used in subsequent processing. As would be expected the solvent resistance (holdout) of the electroconductive coating to the aromatic solvents generally used in the photosensitive coating and to the aliphatic solvents generally used in liquid toning is very important.

In such conventional electroconductive coating compositions, it has been found that very few binders provide the degree of solvent resistance required without deleteriously affecting the high conductivity required in the electroconductive layer. Furthermore, compositions used heretofore require the additional step of precoating the raw paper stock if they are to provide useful electroconductive paper compositions.

Therefore, it would be highly desirable to provide an electroconductive coating composition which can be applied directly to an uncoated nonconductive substrate to produce an electroconductive substrate having excellent resistance to solvents such as the aromatic and aliphatic hydrocarbon solvents.

SUMMARY OF THE INVENTION

The present invention is, in one aspect, an aqueous electroconductive coating composition comprising (1) a water-dispersible electroconductive polymer in an amount sufficient to reduce the surface electrical resistivity of a resultant coated substrate to $10^{12}$ ohms or less at 20% relative humidity and (2) a water-swellable polymer having an average particle size when dispersed in an aqueous solution of the electroconductive polymer in the range from about 1 to about 100 micrometers, said water-swellable polymer being present in an amount sufficient to provide effective coating holdout. For the purposes of this invention, "effective coating holdout" shall mean that sufficient coating remains (is held out) on the surface of the paper to provide a solvent holdout value which is at least 20 percent better than the value obtained with a similar coated paper containing none of the water-swellable polymer.

In a preferred embodiment, the foregoing composition contains a water-dispersible, substantially nonionic, ethylenically unsaturated amide in amounts effective to increase solvent holdout and a compatible binder to maintain viscosity of the composition within a desired range.

In another aspect, this invention is an electroconductive article having incorporated as an electroconductive additive the electroconductive composition described hereinbefore in an amount effective to decrease the surface electrical resistivity of the article.

In a third aspect, the present invention is the aforementioned composition in the form of a coating adhered to a nonconductive substrate to provide an electroconductive substrate, for example, an electroconductive paper as described herein.

In addition to being useful as an electroconductive coating for paper which may be in the form of raw paper stock or a precoated paper, electroconductive compositions of the present invention are also useful as treating compositions for rendering textiles and other porous, synthetic polymer articles antistatic, an electroconductive additives in other coating formulations such as carpet backing formulations, an antistatic coating for fine cell foams, and the like.

DETAILED DESCRIPTION OF THE EMBODIMENTS

Polymers suitable as the electroconductive component in the compositions of the present invention are those water-dispersible polymers having chemically bound to their backbone chains a sufficient number of pendant cationic moieties such as quaternary ammonium, pyridinium and imidazolinium and quaternary phosphonium and ternary sulfonium groups or pendant anionic moieties such as sulfonate, carboxylate and phosphonate to render the polymer electroconductive, i.e., a volume electrical resistivity for the polymer which is less than $10^7$, preferably less than $10^5$, ohm centimeter at 17 percent relative humidity. By water-dispersible is meant that the electroconductive polymer will disperse in water to form a stable aqueous colloidal dispersion or a solution of the polymer. Also included are polymers which require the presence of surface active agents to be dispersed. Of the water-dispersible electroconductive polymers, the water-soluble ones are preferred.

Of the foregoing, polymers containing quaternary ammonium groups as the cationic moieties, e.g., as described by Dolinsky and Dean, *Chem. Tech*, 1, 304–309 (1971), are preferred. Particularly suitable are the poly(vinylbenzyl trialkyl ammonium halide) resins used in Silvernail et al, U.S. Pat. No. 3,011,918 with the poly(diallyl dimethyl ammonium chloride) resins of Booth et al, U.S. Pat. No. 3,544,318 and the quaternized polyepichlorohydrin of Rogers et al, U.S. Pat. No. 3,320,317 being advantageously employed as the electroconductive component. The concentration of cationic moieties in the polymer is not particularly critical so long as the minimum degree of electroconductivity is satisfied. The molecular weight of the polymer is similarly not critical; however higher molecular weight (i.e. >5000) polymers generally perform better than lower molecular weight polymers.

Other suitable cationic electroconductive polymers include the quaternary phosphonium salts and tertiary sulfonium salts of poly(vinylbenzyl chloride) and polyepihalohydrin and the like.

Anionic polymers suitably employed as the electroconductive polymer include the ammonium and alkali metal salts of copolymers of $\alpha,\beta$-ethylenically unsaturated carboxylic acids and anhydrides such as ethylene/acrylic acid copolymers, styrene/maleic anhydride copolymers, polystyrene sulfonates and the like.

The component of the electroconductive composition which imparts coating holdout properties, i.e., enables application of the composition to raw paper stock, is a water-swellable, polymer. This polymer exists in the form of discrete particles which, when dispersed in an aqueous solution of the electroconductive resin have diameters in the range from about 1 to about 100 micrometers, preferably from about 2 to about 60 micrometers. Within this general range of particle size, choice of a particular size is governed by the pore size (interstices between fibers) of the paper being coated. Generally, the particle size is preferably greater than the pore size of the paper. To be "water-swellable", the polymer must contain a sufficient number of hydrophilic groups such as carboxylic acid, amide, quaternary ammonium, sulfonium, amine, and similar polar groups to be able to absorb at least 2 weight parts, preferably from about 4 to about 100 weight parts of water per weight part of polymer in the ionic medium provided by the electroconductive resin. In preferred embodiments, the water-swellable polymer is sufficiently crosslinked to be water-insoluble. For the purposes of this invention, a polymer is considered to be "water-insoluble" if a 0.01 weight percent aqueous dispersion of the polymer plugs a membrane filter constructed of mixed cellulose esters and having an 82 percent porosity and a pore size of 1.2 micrometer. A membrane is plugged if the flow rate of the 0.01 percent dispersion through the filter is reduced to 1/40 of the flow rate of water through filter after 3 cm.$^3$ of the dispersion through 1 cm.$^2$ of filter at a pressure of 3.2 psig. For example, preferred water-swellable, water-insoluble polymers reduce the flow of the 0.01 percent aqueous dispersion through a commercial filter (Millipore filter RA 1.2 micrometer, 13 mm. plain white) to less than 0.5 cm.$^3$/min. after 4 cm.$^3$ of the dispersion pass through the filter at 3.2 psig. It is understood that preferred polymers which are normally water-soluble may become "water-insoluble" after combination with the electroconductive polymer. A polymer is "crosslinked" if polymer molecules are linked together as a result of (1) the inclusion of compounds containing a plurality of polymerizable ethylenically unsaturated groups or (2) post-insertion of methylene ester or ionic bridges. The degree of crosslinking is insufficient to adversely affect the water-swellability of the polymer.

Exemplary water-swellable polymers preferably employed as the coating holdout component include polymers of $\alpha,\beta$-ethylenically unsaturated carboxylic acids and salts thereof such as acrylic acid, methacrylic acid, maleic anhydride, crotonic acid, itaconic acid and others, e.g., as described in U.S. Pat. No. 2,923,692 filed Jan. 25, 1954; and polymers of $\alpha,\beta$-ethylenically unsaturated amides and $\alpha,\beta$-ethylenically unsaturated quaternary ammonium salts, alkali metal and ammonium salts of sulfoalkyl esters and aminoalkyl esters of $\alpha,\beta$-ethylenically unsaturated carboxylic acids and others disclosed in U.S. application Ser. No. 481,598 to Zweigle et al. filed June 21, 1974, which is incorporated by reference in its entirety. Methods for preparing such water-swellable polymers are described in the foregoing references. Examples of suitable water-swellable polymers include the cellulosic polymers such as the alkyl cellulose ethers, e.g., methyl cellulose; hydroxyalkyl cellulose ethers, e.g., hydroxymethyl cellulose, hydroxyethyl cellulose, hydroxypropyl cellulose, dihydroxypropyl cellulose and hydroxybutyl cellulose; alkyl hydroxyalkyl cellulose ethers, e.g., ethyl hydroxyethyl cellulose and methyl hydroxyethyl cellulose; and the carboxymethylalkyl cellulose ethers and carboxymethyl hydroxyalkyl cellulose ethers, e.g., carboxymethyl methyl cellulose and carboxymethyl hydroxyethyl cellulose.

In the coatings made from the compositions of the present invention, the electroconductive polymer is present in an amount sufficient to provide the coating with a surface resistivity of $10^{12}$ ohms or less, preferably less than $10^{11}$ ohms and especially less than $10^{10}$ ohms at 20% relative humidity. The water-swellable polymer is present in the aqueous coating composition in an amount sufficient to provide a coated substrate having a solvent holdout value at least 20 percent, preferably more than 40 percent, better than a similar coated substrate containing none of the water-swellable polymer. In most of the preferred embodiments, the electroconductive polymer constitutes from about 10 to about 99.9 especially from about 25 to about 99, weight parts and the water-swellable polymer constitutes from about 0.1 to about 25, especially from about 0.2 to about 2, weight parts based on 100 weight parts of the total composition. It is found that higher amounts of the water-swellable polymer can be employed, but with no real improvement in coating holdout and a significant increase in viscosity in most instances.

In the compositions containing a cationic electroconductive polymer and a water-swellable polymer bearing anionic groups such as carboxylic acid groups, it is necessary, in order to avoid undesirable thickening or coagulation of the composition, to include compatibilizing materials such as an amide polymer, as described hereinafter.

Materials (hereinafter called compatibilizers) suitable for making the anionic water-swellable polymers compatible with the electroconductive polymer are nonionic organic compounds or polymers such as amide polymers, starches and the like. Such materials are normally used in amounts sufficient to enable the anionic water-swellable polymer to be combined with the electroconductive polymer without causing significant coacervation of the resultant composition. While specific suitable amounts will vary with the particular compatibilizer being used as well as with the particular electroconductive polymer and anionic, water-swellable polymer, generally, amounts of compatibilizer in the range from about 1 to about 99 weight percent based on the weight of the electroconductive polymer are suitable. Amounts in the range from about 10 to about 50 weight percent are preferred.

Suitable amide polymers, optionally employed to increase solvent resistance and to render the anionic water-swellable polymer compatible with cationic electroconductive polymers, are those substantially nonionic, film-forming water-dispersible polymers of $\alpha,\beta$-ethylenically unsaturated amides such as acrylamide, methacrylamide, and the amides of other $\alpha,\beta$-ethylenically unsaturated carboxylic acids such as itaconic, fumaric, citraconic, maleic and the like. It is further understood that the N-substituted derivatives of such amides such as N-methylacrylamide, N-isopropylacrylamide and the like are also suitable. Since the compositions of the present invention are prepared and applied as aqueous solutions or aqueous dispersions, the amide polymer must be at least water-dispersible. Furthermore, a twenty weight percent aqueous solution or dispersion of the polymer should have a Brookfield viscosity, using a Viscometer Model RV with spindle No. 7 at 25° C and 50 rpm, of less than 100,000 cps. at pH 7, preferably in the range from about 15,000 to about 30,000 cps. using spindle No. 6. In addition, the degree of hydrolysis of the acrylamide polymer, i.e., the presence in the polymer of a significant amount of free carboxylic acid or other ionic species, should be controlled. In preferred practices, it has been found that less than about 2 percent hydrolysis based on amide, and preferably less than about 1 percent yields a substantially nonionic amide polymer.

While the homopolymers of acrylamide, especially the water-soluble ones, are preferred, it is understood that water-soluble or water-dispersible copolymers of the unsaturated amide and at least one other nonionic monomer copolymerizable therewith may also be used. Typical of such comonomers include the monovinylidene aromatic monomers such as styrene, $\alpha$-methylstyrene, chlorostyrene, t-butylstyrene and the like; saturated esters of ethylenically unsaturated carboxylic acids such as vinyl acetate, vinyl propionate and vinyl benzoate; ethylenically unsaturated nitriles such as acrylonitrile, methacrylonitrile and fumaronitrile, vinyl and vinylidene halides such as vinyl chloride, vinyl bromide and vinylidene chloride; saturated esters of $\alpha,\beta$-ethylenically unsaturated carboxylic acids such as the alkyl acrylates, alkyl methacrylates and dialkyl maleates; vinyl alkyl ethers and vinyl alkyl ketones. Additionally, small amounts of more hydrophilic monomers such as N-alkylolamides, e.g., N-methylolacrylamide and hydroxyalkyl acrylates and methacrylates, e.g., hydroxyethyl acrylate and hydroxypropyl acrylate can be used in limited amounts, e.g., up to 25 weight percent.

To interact most beneficially with the electroconductive polymer, it is desirable that the amide polymer contain at least about 50 weight percent of polymerized ethylenically unsaturated amide, with the preferred amount of amide depending upon the amount of amide moiety required to yield the desired water dispersibility. Many of the commercially available amide polymers in the form of aqueous solutions or dispersions containing 10 to 30 weight percent of polymer solids are particularly convenient for combining with the electroconductive polymer in the practice of the instant composition.

In instances wherein a compatibilizer is not required, the amide polymer can be employed solely to enhance solvent holdout. In such cases, the amide polymer may contain cationic moiety, e.g., a copolymer of acrylamide and vinylbenzyl trimethyl ammonium chloride.

Binders suitably employed as additional compatibilizers and/or as viscosity releasing agents in the practice of this invention include those aqueous colloidal dispersions of natural binders and water-insoluble, synthetic organic polymers or mixtures thereof provided that they are film-forming under the drying conditions which may be employed in making the electroconductive papers of the present invention and which are compatible with the other components of the instant electroconductive composition. For the purposes of the invention, a binder shall be considered compatible if, when combined with the electroconductive resin and the water-swellable polymers, it does not coagulate the resulting disperse system.

Examples of suitable natural binders are starch including the cationic and modified starches, and others, particularly those which are cationic, non-ionic or only slightly anionic.

Examples of suitable synthetic binders include latexes of the following polymers: styrene/butadiene copolymers, styrene/butadiene/acrylonitrile copolymers, butadiene/acrylonitrile copolymers, polymers of alkyl esters of $\alpha,\beta$-ethylenically unsaturated carboxylic acids such as ethyl acrylate/methyl methacrylate copolymers, hydroxyethyl acrylate/butyl acrylate/acrylonitrile copolymers and methyl methacrylate/butadiene copolymers, vinyl acetate homopolymers and copolymers, vinyl chloride and vinylidene chloride polymers, polymers of conjugated dienes such as butadiene, and other water-insoluble, film-forming polymers conventionally employed as binders. Such binders are stabilized by anionic, non-ionic or cationic functionality provided that type and degree of anionic functionality must be controlled in order to be compatible with the other components of the composition.

In preferred practice of the present invention, the electroconductive coating composition comprises from about 20 to about 55 weight parts of the electroconductive polymer, especially from about 30 to about 45 weight parts; (2) from about 5 to about 30 weight parts of the amide polymer, especially from about 10 to about 25 weight parts; (3) from about 20 to about 50 weight parts, especially from about 35 to about 45 weight parts of the low viscosity binder; and, (4) from about 0.1 to about 1 weight part, especially from about 0.2 to about 0.5 weight part of the crosslinked water-swellable polymer, all parts being dry weight parts and based on 100 dry weight parts of total composition.

This preferred electroconductive composition is prepared by first combining the crosslinked, water-swellable polymers with the amide polymer, subsequently adding the electroconductive polymer and finally adding the binder and pigment if pigment is employed. If the crosslinked polymer bears amide functionality, the order of addition of the first three of the aforementioned components is not critical as it is when the crosslinked polymer bears acid functionality.

Depending upon the requirements of the composition, the method for application thereof and the final product, the electroconductive composition of the present invention can be further formulated with standard additives such as pigments which significantly reduce tackiness of the coating, e.g., clay, calcium carbonate and titanium dioxide; extenders and other binders. While optimum formulations will depend on specific process and end use specifications, most pigmented formulations will contain ingredients on a dry weight basis in the following proportions: from about 60 to about 90 weight percent of the aforementioned electroconductive composition and from about 40 to about 10 weight percent of the pigment, particularly when the pigment is clay or calcium carbonate. Also, the maximum total solids of the resulting pigmented aqueous composition will, for such general procedures, range from about 30 to about 40 weight percent total solids in the aqueous composition. In such compositions wherein a pigment is to be added, the pigment may be added separately to the electroconductive composition or as a mixture of binder and pigment to the other components of the composition.

In the preparation of the electroconductive coated articles of the present invention, a nonconductive substrate (normally paper, but alternatively a porous organic polymer film, fibrous material, particulate, or foam) is coated by applying in a conventional manner the aqueous electroconductive coating composition described hereinbefore.

For example, in the preparation of an electrostatographic printing paper, a paper substrate in the form of raw stock or a precoated paper is coated with the aqueous electroconductive coating composition in an amount sufficient to reduce the surface electrical resistivity to the required level, e.g., from $10^{10}$ to $10^{12}$ ohms at 20 percent relative humidity. Typically a blade coater is used to apply the coating to the paper with a size press, roll coater or air knife being suitable alternative means. While for some applications it may be desirable to apply the coating to a single side of the paper, it is generally preferred to apply the coating to both sides of the paper to minimize toner deposition in non-image areas and back printing. In the case of raw paper stock, the amount of coating composition and pigment applied to the paper is generally sufficient to provide a coat weight per side of about 0.5 to about 2.5 pounds per 3000 square feet of paper. In the case of precoated paper stock, only about 0.3 to about 1.3 pounds of the electroconductive coating is applied to one side of 3000 square feet of paper.

After the coated paper is dried, any one or more of the conventional photoconductive or dielectric coatings are applied to the coated paper in a conventional manner to produce a finished electro-photographic paper. For example, most photoconductive coating compositions comprise a photoresponsive particulate solid such as zinc oxide dispersed in a hydrocarbon solution of a non-conductive or dielectric binder such as an oil-soluble synthetic binder as described hereinbefore. After application of the photoconductive coating composition to the electroconductive coated paper, the paper is subjected to conditions sufficient to drive off the hydrocarbon solvent.

The following examples further illustrate the present invention and should not be construed as limiting its scope. Unless otherwise stated, all parts and percentages are by weight.

EXAMPLE 1

An aqueous composition (Sample No. 1) is prepared by first mixing 8 parts of an aqueous dispersion (5% solids) of a crosslinked polyacrylic acid microgel with 98 parts of 20 percent aqueous solution of an acrylamide homopolymer. To the resulting composition is added in order 89 parts of 33.7% aqueous solution of poly(vinyl benzyltrimethylammonium) chloride prepared by the process of U.S. Pat. No. 3,607,989 to Sonnabend, and 105 parts of 47.7% solids latex of styrene/butadiene (60/40) copolymer. The resulting formulated composition is applied as a coating on both sides of a sheet of raw paper stock (basis weight of 26.1 lbs./3000 ft.$^2$) at a coat weight of 2.5 lbs. per side per 3000 ft.$^2$ using a No. 3 Meyer rod. The raw paper stock has a Sheffield porosity of 230 for 1.5 in. diameter sample and a Sheffield smoothness of 160. The coated sheet is dried, cut into 6 test strips and conditioned for 24 hours at room temperature and 17% relative humidity. The surface electrical resistance (SER) and solvent holdout (SH) of each test strip are measured and the average of the results are recorded in Table I.

For the purpose of comparison, a control composition (Sample No. C) is prepared according to the previous sample except that no crosslinked polyacrylic acid is employed. The control composition is similarly coated on paper which is tested for SER and SH. The results are also recorded in Table I.

TABLE I

| Sample No. | 1 | C* |
|---|---|---|
| Ingredients (dry weight), pts. | | |
| S/B Latex (a) | 50 | 50 |
| PVBAC (b) | 30 | 30 |
| Polyacrylamide (c) | 19.6 | 20 |
| PAA Microgel (d) | 0.4 | — |
| % Solids | 32 | 32 |
| pH | 8 | 8 |
| Viscosity, (1) cps. | | |
| Total Coat Weight, lbs./3000 ft.$^2$ | 5 | 5 |
| SER(2), ohms | | |
| Log SER | | |
| Wire | 10.0 | 10.0 |
| Felt | 9.8 | 9.9 |
| SH (3), 10 sec. | | |
| % Toluene Penetration | | |
| Wire | 50 | 65 |
| Felt | 8 | 30 |
| % Isopar Penetration | | |
| Wire | 45 | 65 |

TABLE I-continued

| Sample No. | 1 | C* |
|---|---|---|
| Felt | 4 | 15 |

*Not an example of the invention.
(a) 47.7% solids latex of styrene/butadiene (60/40) copolymer.
(b) Poly(vinyl benzyltrimethylammonium) chloride in 33.7% aqueous solution.
(c) Homopolymer of acrylamide in 20% aqueous solution wherein the homopolymer has a degree of hydrolysis of 0.5 and a Brookfield RVT viscosity (20% aqueous solution, No. 4 spindle, 20 rpm, pH - 5–6, 25° C.) of 15,000 cps.
(d) Crosslinked polyacrylic acid microgel sold by B. F. Goodrich under the trade name Carbopol 934. The microgel has particle diameters of 25–50 micrometers in the aqueous composition of Sample No. 1.
(1) Brookfield viscosity determined at 50 rpm and 72° F. using Viscometer RV spindle No. 4.
(2) Surface electrical resistivity measured at 17% relative humidity according to the general procedure of ASTM D-257-66 using a Keithly Electrometer Model 16-B with a Model 6105 Resistivity Adapter operating at 100 volts.
(3) Solvent holdout measured visually by means of a solvent penetration test described by A. S. Diamond, TAPPI, 48, 94a, (October 1965), using bromophenol blue as a solvent dye and a standard reference chart.

As evidenced by the results recorded in Table I, a very small amount of the crosslinked polyacrylic acid microgel substantially restricts coating composition from passing into the body of the raw paper stock thereby significantly increasing the solvent resistance of the resultant coating.

EXAMPLE 2

An aqueous composition is prepared by first mixing 8 parts of the 5% solids aqueous dispersion of crosslinked polyacrylic acid employed in Example 1 with 73 parts of 20% aqueous solution of an acrylamide homopolymer. To the resulting composition is added in order 89 parts of a 33.7% aqueous solution of poly(vinyl benzyltrimethylammonium) chloride, 73.5 parts of 47.7% solids latex of styrene/butadiene (60/40) copolymer and 20 parts of pigment grade clay (Hydrofine Clay, J. T. Huber Corp.) prepared as a 65% solids dispersion in water containing 0.8 part tetrasodium pyrophosphate (based on clay solids) as a dispersant. The resulting formulated electroconductive composition is applied as a coating on both sides of a sheet of raw paper stock (basis weight 26.1 lbs./3000 ft.²) at a coat weight of 2.5 lbs. per side per 3000 ft.² using a No. 3 Meyer rod. The raw paper stock has a Sheffield porosity of 230 for a 1.5 in. diameter sample and a Sheffield smoothness of 160. The coated sheet is dried, cut into 6 test strips and conditioned for 24 hours at room temperature and 17% relative humidity. The SER and solvent holdout (SH) of each test strip are measured and the average of the results are recorded in Table II.

As additional illustration of the invention, there are prepared two sample compositions Sample Nos. 2 and 3 similar to the foregoing one except that poly(diallyl dimethylammonium)chloride and quaternized polyepichlorohydrin, respectively, are employed as the electroconductive resin. In the foregoing manner, test strips are prepared using these two samples and are tested. The results of these tests are also recorded in Table II.

TABLE II

| Sample No. | 1 | 2 | 3 |
|---|---|---|---|
| Ingredients (dry weight), pts. | | | |
| HF Clay | 20 | 20 | 20 |
| S/B Latex (a) | 35 | 35 | 35 |
| PVBAC (b) | 30 | — | — |
| PDAMC (e) | — | 30 | — |
| QPI (f) | — | — | 30 |
| Polyacrylamide (c) | 14.6 | 14.6 | 14.6 |
| PAA Microgel (d) | 0.4 | 0.4 | 0.4 |
| % Solids | 36.3 | 30.0 | 30.0 |
| pH | 8 | 8 | 8 |
| Viscosity, (1) cps. | 2200 | 4560 | 2080 |
| Total Coat Weight, lbs./3000 ft.² | 5.0 | 5.0 | 5.0 |
| SER (2) | | | |
| Log SER (17% R.H.) | | | |
| Wire | 9.5 | 10.1 | 9.9 |
| Felt | 9.5 | 10.0 | 9.7 |
| SH (3) | | | |
| % Toluene Penetration | | | |
| Wire (10 sec.) | 50 | 65 | 60 |
| Felt (10 sec.) | 10 | 4 | 4 |
| % Isopar Penetration | | | |
| Wire (10 sec.) | 60 | 80 | 90 |
| Felt (10 sec.) | 12 | 8 | 10 |

(a)–(d) - Same as in Table I.
(e) Poly(diallyl dimethylammonium chloride) sold by Merck Chemical Under the tradename Merck 261.
(f) Quaternized polyepichlorohydrin sold by Nalco Chemical under the tradename Nalco 61J16.
(1)–(3) - Same as in Table I.

EXAMPLE 3

Following the general procedure of Example 2, two compositions without clay pigment are prepared using different proportions of the named igredients and in one sample a different coating holdout component. Test strips of raw paper stock coated with the compositions are made, tested and the results are recorded in Table III.

TABLE III

| Sample No. | 1 | 2 |
|---|---|---|
| Ingredients (dry weight), pts. | | |
| S/B Latex (a) | 50 | 50 |
| PVBAC (b) | 30 | 30 |
| Polyacrylamide (c) | 19.6 | 19.6 |
| PAA Microgel (d) | 0.4 | — |
| PAM Microgel (g) | — | 0.4 |
| % Solids | 32.0 | 33.0 |
| pH | 8 | 8 |
| Viscosity, (1) cps. | 2640 | 2476 |
| Total Coat Weight, lbs./3000 ft.² | 5.0 | 5.0 |
| SER(2) | | |
| Log SER (17% R. H.) | | |
| Wire | 10.1 | 9.9 |
| Felt | 9.8 | 9.7 |
| SH (3), 10 sec. | | |
| % Toluene Penetration | | |
| Wire | 50 | 30 |
| Felt | 8 | 8 |
| % Isopar Penetration | | |
| Wire | 45 | 35 |
| Felt | 4 | 4 |

(a)–(d) - Same as in Table I.
(g) Acrylamide/vinylbenzyl trimethylammonium chloride (80/20) copolymer microgels having an average water swollen diameter of 1–15 micrometers.
(1)–(3) - Same as in Table I.

EXAMPLE 4

Following the procedure of Example 2, several compositions are prepared using different proportions of the ingredients except clay pigment which is used in the same amount. Test strips of raw paper stock coated with the compositions are made and tested. The results are recorded in Table IV.

TABLE IV

| Sample No. | 1 | 2 | 3 | 4 | 5 | 6 |
| --- | --- | --- | --- | --- | --- | --- |
| Ingredients (dry weight), pts. | | | | | | |
| HF Clay | 20 | 20 | 20 | 20 | 20 | 20 |
| S/B Latex (a) | 40 | 30 | 35 | 30 | 40 | — |
| PVBAC (b) | 24 | 30 | 30 | 28 | 35 | 30 |
| Polyacrylamide (c) | 15.6 | 19.6 | 14.6 | 11.6 | 14.6 | 9.6 |
| PAA Microgel (d) | 0.4 | 0.4 | 0.4 | 0.4 | 0.4 | 0.4 |
| % Solids | 34.0 | 33.2 | 36.3 | 36.3 | 34.4 | 38.3 |
| pH | 8 | 8 | 8 | 8 | 8 | 8 |
| Viscosity, (1) cps. | 1456 | 1932 | 2200 | 1424 | 1364 | 1536 |
| Total Coat Weight lbs./3000 ft. | 5.0 | 5.0 | 5.0 | 5.0 | 5.0 | 5.0 |
| SER (2) Log SER (17% R.H.) | | | | | | |
| Wire | 10.1 | 9.8 | 9.5 | 9.6 | 9.4 | 9.3 |
| Felt | 9.9 | 9.7 | 9.5 | 9.6 | 9.3 | 9.3 |
| SH (3), 10 sec. % Toluene Penetration | | | | | | |
| Wire | 75 | 60 | 50 | 85 | 70 | 70 |
| Felt | 20 | 15 | 10 | 45 | 25 | 15 |
| % Isopar Penetration | | | | | | |
| Wire | 60 | 50 | 60 | 80 | 70 | 80 |
| Felt | 10 | 8 | 12 | 40 | 15 | 25 |

(a)–(d) - Same as Table I.
(1)–(3) - Same as Table I.

EXAMPLE 5

Two compositions are prepared according to Example 2, except that a latex of ethyl acrylate/methyl methacrylate/acrylic acid (67.8/30/2.1) terpolymer is employed as the latex binder and clay pigment is not employed in one composition. Test strips of raw paper stock coated with these compositions are made and tested, and the results are recorded in Table V.

TABLE V

| Sample No. | 1 | 2 |
| --- | --- | --- |
| Ingredients (dry weight), pts. | | |
| HF Clay | — | 20 |
| Acrylate Latex (h) | 50 | 30 |
| PVBAC (b) | 30 | 30 |
| Polyacrylamide (c) | 19.6 | 19.6 |
| PAA Microgel (d) | 0.4 | 0.4 |
| % Solids | 31.2 | 32.6 |
| pH | 8 | 8 |
| Viscosity, (1) cps. | 1552 | 1684 |
| Coat Weight, lbs./3000 ft.$^2$ | 5.0 | 5.0 |
| SER (2) Log SER (17% R.H.) | | |
| Wire | 10.1 | 10.0 |
| Felt | 9.9 | 9.9 |
| SH (3), 10 sec. % Toluene Penetration | | |
| Wire | 65 | 45 |
| Felt | 6 | 10 |
| % Isopar Penetration | | |
| Wire | 55 | 45 |
| Felt | 10 | 5 |

(b)–(d) - Same as Table I.
(h) 44.5% solids latex of ethyl acrylate/methyl methacrylate/acrylic acid (67.8/30.1/2.1) terpolymer.
(1)–(3) - Same as Table I.

EXAMPLE 6

An aqueous composition (Sample No. 1) is prepared by mixing 490 parts of 20% aqueous solution of poly(-vinyl benzyltrimethylammonium) chloride with 40 parts of an aqueous dispersion (5% solids) of polyacrylamide microgels. The resulting formulated electroconductive composition is applied to raw paper stock by the procedure described in Example 1 to provide a coated paper having a coat weight per side of 1.1 lbs./3000 ft.$^2$. The SER and SH for the paper are determined and the results are recorded in Table VI.

For the purpose of comparison, the 20% aqueous solution of poly(vinyl benzyltrimethylammonium) chloride (Sample No. C) is applied to the raw paper stock by the foregoing procedure to provide a coated paper having a coat weight per side of 1.2 lbs./3000 ft.$^2$. The SER and SH for this control paper are determined and the results are recorded in Table VI.

TABLE VI

| Sample No. | 1 | C* |
| --- | --- | --- |
| Ingredients (dry weight), pts. | | |
| PVBAC (h) | 98 | 100 |
| PAAM (g) | 2 | — |
| % Solids | 19.6 | 20 |
| Viscosity (1), cps. | 816 | 608 |
| Total Coat Weight, lbs./3000 ft.$^2$ | 2.2 | 2.4 |
| SER (2), ohms Log SER | | |
| Wire | 8.6 | 8.4 |
| Felt | 8.6 | 8.5 |
| SH (3), % Toluene Penetration | | |
| Wire, 5 sec. | 30 | 55 |
| Felt, 10 sec. | 30 | 55 |
| % Isopar Penetration | | |
| Wire, 5 sec. | 35 | 65 |
| Felt, 10 sec. | 25 | 50 |

*Not an example of the invention.
(g) - Same as in Table III.
(h) High molecular weight poly(vinyl benzyltrimethyl-ammonium)chloride having a viscosity of 608 cps. in 20% aqueous solution under conditions specified in (1).
(1) Brookfield viscosity determined using Viscometer Model RV with spindle No. 3 at 50 rpm. and 25° C.
(2)–(3) - Same as in Table I.

What is claimed is:

1. An aqueous coating composition comprising as ingredients (1) a water-dispersible, electroconductive polymer in an amount sufficient to reduce the surface electrical resistivity of a non-conductive substrate having its surface coated with said composition to a value no greater than $10^{12}$ ohms at 20% relative humidity, and (2) a water-swellable polymer having an average particle diameter when dispersed in the aqueous coating composition in the range from about 1 to about 100 micrometers, said water-swellable polymer being present in an amount sufficient to provide coating holdout when the composition is applied to raw paper stock.

2. The aqueous composition of claim 1 which comprises from about 10 to about 99.9 dry weight parts of the electroconductive polymer and from about 0.1 to about 25 dry weight parts of the water-swellable polymer per 100 dry weight parts of said composition.

3. The aqueous composition of claim 2 which also contains a nonionic, film-forming, water-dispersible polymer of an α,β-ethylenically unsaturated amide, said nonionic polymer being compatible with ingredients (1) and (2) of claim 1.

4. The aqueous composition of claim 2 which also contains a binder compatible with ingredients (1) and (2) of claim 1.

5. The aqueous composition of claim 1 comprising (1) from about 20 to about 55 weight parts of the electroconductive polymer; (2) from about 5 to about 30 weight parts of a nonionic, film-forming, water-dispersible amide polymer; (3) from about 20 to about 50 weight parts of a compatible binder; and (4) from about 0.1 to about 1 weight part of the water-swellable polymer, said parts being dry weight parts and based on dry weight parts of said composition.

6. The aqueous composition of claim 5 wherein the water-swellable polymer is a crosslinked poly(acrylic acid).

7. The aqueous composition of claim 5 wherein the water-swellable polymer is a crosslinked polyacrylamide.

8. The aqueous composition of claim 5 wherein the electroconductive polymer is a poly(vinyl benzyltrimethylammonium)chloride, the amide polymer is a polyacrylamide, the binder is a compatible latex of a styrene/butadiene copolymer and the water-swellable polymer is a crosslinked poly(acrylic acid) or a crosslinked polyacrylamide.

9. The composition of claim 1 in the form of a coating adhered to a non-conductive substrate.

10. The composition of claim 9 wherein the substrate is paper.

11. The composition of claim 1 in the form of an electroconductive additive in an electroconductive article.

12. An electroconductive paper comprising a paper substrate and a dried coating of the composition of claim 1 adherent thereto.

13. A dried electroconductive coating of the composition of claim 1.

14. The aqueous coating composition of claim 1 wherein the water-swellable polymer is a water-insoluble polymer that is retained on a membrane filter having a pore size of 1.2 micrometer.

15. The aqueous coating composition of claim 14 wherein (1) the water-swellable polymer can absorb from about 4 to about 100 weight parts of water per weight part of water-swellable polymer when the water-swellable polymer is placed in an ionic medium provided by the electroconductive polymer and (2) a 0.01 weight percent aqueous solution of said water-swellable polymer will reduce the flow of the dispersion through a filter having a diameter of 13 mm and a pore size of 1.2 micrometer to less than 0.5 cm$^3$/min after 4 cm$^3$ of the dispersion has passed through the filter at pressure of 3.2 psig.

16. The aqueous coating composition of claim 15 wherein the water-swellable polymer is a crosslinked polyacrylic acid microgel having particles with diameters in the range of 25–50 micrometers.

* * * * *

UNITED STATES PATENT AND TRADEMARK OFFICE
CERTIFICATE OF CORRECTION

PATENT NO. : 4,007,148
DATED : February 8, 1977
INVENTOR(S) : Sally P. Ginter; Ralph E. Friedrich It is certified that error appears in the above-identified patent and that said Letters Patent are hereby corrected as shown below:

Column 1, line 53, delete "ememplified" and insert --exemplified--;'

Column 2, line 65, delete "an" and insert --as--;

Column 10, line 31, delete "igredients" and insert --ingredients--;

Column 11, Table IV, under Sample No. 4, line 2, delete "30" and insert --40--;

Column 11, Table IV, under Sample No. 5, line 2, delete "40" and insert --30--;

Column 11, Table IV, under Sample No. 6, line 2, insert --40--;

Column 11, Table IV, line 13, after "Total Coat Weight", insert a comma --,--.

Signed and Sealed this

Fourteenth Day of June 1977

[SEAL]

*Attest:*

RUTH C. MASON
*Attesting Officer*

C. MARSHALL DANN
*Commissioner of Patents and Trademarks*